US008663527B2

(12) United States Patent
van Rijn

(10) Patent No.: US 8,663,527 B2
(45) Date of Patent: *Mar. 4, 2014

(54) METHOD FOR ARRANGING ENGAGEMENT MEANS IN A CONCRETE PART

(75) Inventor: Robertus Cornelis Maria van Rijn, Vinkeveen (NL)

(73) Assignee: Connector Vinkeveen B.V., Vinkeveen (NL)

( * ) Notice: Subject to any disclaimer, the term of this patent is extended or adjusted under 35 U.S.C. 154(b) by 1573 days.

This patent is subject to a terminal disclaimer.

(21) Appl. No.: 10/519,272

(22) PCT Filed: Jun. 27, 2003

(86) PCT No.: PCT/NL03/00478
§ 371 (c)(1),
(2), (4) Date: Jun. 17, 2005

(87) PCT Pub. No.: WO2004/002702
PCT Pub. Date: Jan. 8, 2004

(65) Prior Publication Data
US 2005/0241263 A1 Nov. 3, 2005

(30) Foreign Application Priority Data

Jun. 27, 2002 (NL) ..................................... 1020949

(51) Int. Cl.
*B28B 1/30* (2006.01)
*B28B 7/30* (2006.01)
*B28B 7/28* (2006.01)
(52) U.S. Cl.
USPC ........................................ 264/279.1; 264/333
(58) Field of Classification Search
USPC .............................................. 264/333, 279.1
See application file for complete search history.

(56) References Cited

U.S. PATENT DOCUMENTS 1,157,895 A * 10/1915 Murphy et al. ................. 52/705
3,685,782 A * 8/1972 Kowell ............................ 249/86

(Continued)

FOREIGN PATENT DOCUMENTS

| BE | 502 991 A | 5/1951 |
| DE | 43 24 522 C1 * | 1/1995 |
| WO | 98/57004 | 12/1998 |

OTHER PUBLICATIONS

EPO, Translation of DE 4324522, pp. 1-5.*

(Continued)

*Primary Examiner* — Christina Johnson
*Assistant Examiner* — Patrick Butler
(74) *Attorney, Agent, or Firm* — The Webb Law Firm

(57) ABSTRACT

A method for arranging engagement means in a concrete body. These engagement means can come into contact with securing means, resulting in a coupling of considerable strength between the concrete part and the said securing means. The engagement means may comprise a screw thread, bayonet-like structure or the like arranged in the concrete. However, it is also possible for the engagement means to be designed as a separate component which is placed into the concrete material. This separate component is then provided with the engagement means proper in that it is provided with a screw thread, bayonet catch or the like. In this way, it is possible to secure construction parts to the concrete part, to hoist the concrete part and to carry out further actions with this part. It is also possible to adjust the concrete part with the aid of adjustment bolts which engage in the engagement means.

14 Claims, 3 Drawing Sheets

(56) References Cited

U.S. PATENT DOCUMENTS 3,889,916 A * 6/1975 Ilukowicz ........................ 249/59
4,003,545 A    1/1977 Tanaka
4,018,470 A * 4/1977 Tye .................................. 294/89
4,074,499 A    2/1978 Mess
4,437,276 A    3/1984 Goldberg 5,660,020 A * 8/1997 Reay ............................ 52/745.2

OTHER PUBLICATIONS

Schreiber Translation, Inc., Translation of BE 502991, Jul. 2008, cover and pp. 1-17.*

* cited by examiner

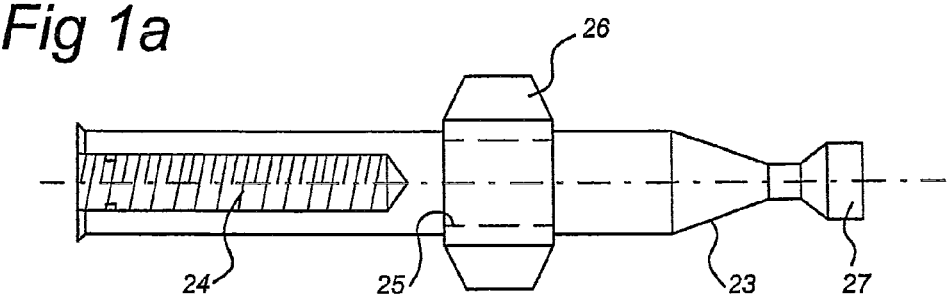
Fig 1a
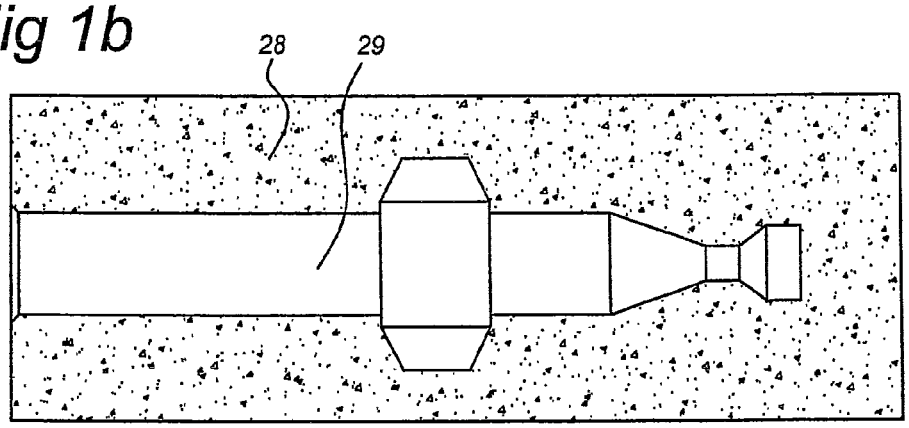
Fig 1b
Fig 2
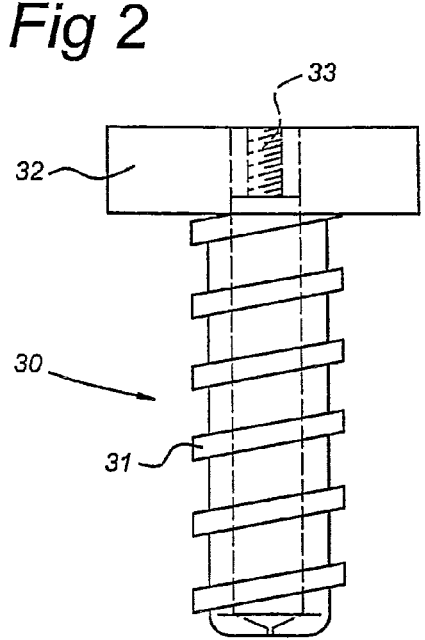
Fig 3
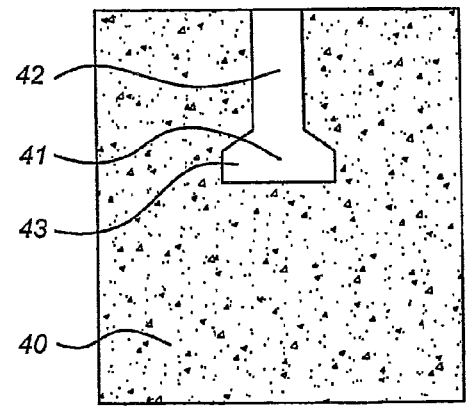

METHOD FOR ARRANGING ENGAGEMENT MEANS IN A CONCRETE PART

BACKGROUND OF THE INVENTION

1. Field of the Invention

The present invention relates to a method for arranging engagement means in a concrete part, comprising the steps of providing a body whose exterior comprises an elastomer material, with mechanical properties which are such that when tensile stress is applied to the said body there is a considerable reduction in the external diameter; encasing the said body in concrete material and removing it therefrom after (partial) setting.

2. Description of Related Art

A method of this type is known from BE-502991. This document describes the production of an opening in a concrete part which has a stepped, dovetail-like blind end. The purpose/use of an opening of this type is not clear from this Belgian patent.

SUMMARY OF THE INVENTION

The object of the present invention is to provide engagement means in a concrete part. In the context of the present application, the term engagement means is to be understood as meaning any form of structure with which it is possible to provide a fixed coupling to securing means. Subsequently, after the concrete has set, these securing means are brought into engagement with the engagement means and enable a considerable load to be applied to the concrete part. Examples will be given below.

In a method as described above, this object is achieved by the fact that the said body is elongate and is removed from the concrete in its longitudinal direction and is provided with a projection which, at a distance from its end located at the boundary surface of the concrete, is positioned transversely with respect to the longitudinal direction and leaves behind a non-release recess in the concrete after setting, which recess comprises securing means for an engagement part which is then fitted into the concrete. This engagement part can absorb both tensile and compressive forces.

According to the present application, the engagement means are arranged in the concrete material with the aid of a body which at least externally consists of an elastomer material and the diameter of which under tensile load, after partial setting of the concrete, decreases considerably, so that easy removal is possible.

There are substantially two possible ways of realising the engagement means. A first possibility is to form an imprint in the concrete material itself, this imprint functioning as an engagement means. Examples of this include a screw thread, slot-like structures which allow a bayonet closure, for example shaped passages or engagement surfaces which allow through-connection and the like.

A second possibility is for a part which remains permanently in the concrete material to be arranged, as securing means, on or in front of the body with an external surface made from elastomer material which is to be cast into the concrete. This part may have a larger external diameter than the external diameter of the body at the same position when it is being cast into the concrete. Examples of parts of this type include nuts, sleeves, studs and the like. Parts of this type may in turn be internally or externally provided with structures which allow connection to securing means. In the case of the variant in which a part is arranged in the body and remains permanently in the concrete, for example the abovementioned stud, the body will extend at least partway around the said part. This section of the body which extends around the said body may in turn be provided with a particular profiling on the outside. Moreover, it is in this way possible to encase (steel) plates, pipes and the like, from/through which the engagement means will subsequently be arranged.

Carrying out the method according to the invention in the manner described above gives rise to numerous possible options for use in concrete structures. A number of examples are given below.

Any type of structure which allows the concrete part in question to be hoisted can be pushed or screwed into the engagement means. A securing means of this type preferably comprises a steel bolt or pin. It is possible for a bolt of this type either to engage in the screw thread which has been formed directly in the concrete or to engage in a nut which has been cast into the concrete.

In addition to hoisting purposes, securing means of this type acting on the engagement means can also be used to adjust concrete structures. It is possible to screw a bolt made either from metallic material or a plastic or from concrete material into a screw thread arranged in the concrete part and thereby to adjust the latter. It is then possible for a bolt of this type to be either removed or encased.

It will be understood that bolts of this type can also be used to secure further structures. In this way, it is even possible to construct concrete structures from slabs or parts which are arranged removably.

It is possible to use the screw thread or other connection for constructions which are to be used temporarily, such as scaffolding or safety rails. It is also possible to provide for the use of structures larger than the bolt described above to be permanently screwed in place. Examples are plastic posts, columns (optionally made from concrete). With columns of this type, it is possible, in combination with a concrete structure, to erect constructions particularly quickly and if appropriate subsequently remove them again for further use.

According to an advantageous embodiment of the invention, the projection comprises a continuous surface which is embodied in such a manner that both tensile and compressive forces can be applied to it.

According to the invention, it is proposed to place a body in the formwork, which is removed again from it after (partial) setting of the concrete. Unlike in known structures, at least the outer side of this body is made from an elastomer material. The properties of the body are such that when a tensile load is applied to it (at the core connected to the outer casing) during removal, the cross section (diameter) of the said body decreases in size considerably. This reduction in diameter is elastic, i.e. the body returns to its original form and can be reused after the tensile load on the said body is eliminated during removal from the concrete. What this means is that it is possible to produce a cavity in the concrete which matches the exterior of the body without significant damage to the external surface of the body. A body of this type can be used a large number of times. The price of producing cavities falls as a result, and moreover the method described above is particularly easy to use. The body is preferably positioned completely inside the formwork.

The body according to the invention can preferably be removed by hand.

A particular embodiment of the body provides for there to be a core with a relatively high tensile strength and an elastomer material surrounding it. According to a further embodiment of the present invention, this core (for complex shapes) can be separated from the surrounding material, thus further simplifying the removal of the body from the concrete. After all, this means that the core can be removed from the cast structure first of all, followed by removal of the part of the body which surrounds the core. Another possibility is for the core to be expandable. The concrete material is cast around the body in this expanded position, and after (partial) setting, the core is returned to a non expanded position, so that the body is easy to remove. In all cases, the use of the core is very important, in particular in the case of relatively elongate bodies, in order to ensure the dimensional stability of the body while the concrete is being poured in. The core may be of hollow or solid design and, on account of its shape and configuration, preferably gives space to the outer casing; it is also possible for a permanent part which adjoins the removable body to be arranged in the cast concrete object, for example a connecting pipe between the passages.

One example of an elastomer material which has the properties described above is a polysiloxane material. This material undergoes considerable constriction when a tensile load is applied and moreover has no tendency whatsoever to adhere to concrete material, so that removal from the set concrete material is possible with even a slight reduction in cross section. It is also possible for the outer casing to be provided on the inner side with a concertina shape, with the result that the body can still be removed easily even in the case of extreme embodiments. The core may be either fixedly or releasably connected to the outer casing. In the former case, this securing is preferably implemented in the vicinity of that end of the body which is located at the formwork, i.e. during the application of a pulling movement during removal, the tensile force is introduced via the core to the outer casing in the vicinity of the end which is located closest to the boundary surface of the concrete part. As a result, that part of the outer casing which extends into the concrete material can be optimally deformed, i.e. reduced in diameter, so that removal of the body is optimized. By using a core, it is possible for the body to be of relatively rigid design, which is important when securing it to a formwork wall in a horizontal position and is also important when concrete is being poured onto it. This means that the body is preferably of self-supporting design.

That end of the body which bears against the inner side of the formwork is preferably secured to the formwork. This can be achieved by fitting a bolt or the like through the formwork wall and providing the supporting surface of the body with a receiving means for a bolt of this type. The body may be provided with a reinforcement, such as a coil, in the vicinity of the periphery.

The method described above can be used to produce any conceivable type of cavity in a concrete material. A few non-limiting examples of such cavities will be given below.

With the present invention it is now possible to produce a cavity in a concrete part, which cavity is elongate and at both ends opens out at the same boundary surface of the concrete part. A cavity of this type can be produced by the introduction of a single body. However, it is also possible for a body of this type to be of dividable, so that after the concrete has set one part can be removed from both ends, if appropriate with a pipe part being left behind. This is of interest in particular if the cavity is embodied to widen in the vicinity of the boundary surface. It is possible for the two parts to be (temporarily) coupled using a coupling part provided at the ends or with the aid of an auxiliary structure.

An above-described cavity with two ends ending at the same boundary surface of a concrete part can also be used for a hoisting sling or other hoisting feature to be arranged in. The connecting part between these two cavities (pipe part) in this case comprises the securing means for engagement part or engagement surface. The cavity, which at both ends open out at the same boundary surface of the concrete part, and which is U-shaped, is designed to receive a hoisting feature.

To produce a non-rectilinear cavity of this type, it is possible to use two of the bodies described above which are widened at the two different ends.

The embodiment in which the cavity extends as far as two boundary surfaces of the concrete part can also be used to receive parts for holding formwork walls together. When concrete is poured between two opposite formwork walls, an outwardly acting pressure is exerted on the walls. Structures which extend through the mould cavity, mechanically couple the walls to one another and can also be used as spacers for the said walls are used to absorb this pressure. According to one embodiment, a coupling of this nature may comprise a central stud which, however, does not extend all the way to the end surface of the concrete part which is to be poured, but rather ends in the cavity which is to be produced. A sleeve with the properties described above, providing for a through-connection, can be screwed onto the said stud. After the concrete has been poured, a sleeve of this type is easy to remove, and the cavity formed in this way can either be used for further coupling or can be filled with more concrete or closed off using a stopper. The use of a stainless steel part can be mentioned as an example of further coupling. According to an alternative, a similar body to that described above can be clamped between the two opposite formwork parts. In this case, a stud extends both through the body and through the formwork parts and is provided with nuts on the outside.

Another possibility is the recessed arrangement of one or more nuts, sleeves or other structures in the concrete material, in which case an open connection must exist between these nuts (etc.) and the exterior of the concrete structure, for example for receiving a stud or other part which has subsequently to be coupled to the nut, sleeve, etc.

For this purpose, according to the invention it is readily possible firstly to position the nut etc. and then the above-described body which provides the subsequent connecting cavity. However, it is also possible for the nut, sleeve or the like to be pushed onto a specially shaped body, the cross-sectional area of which at the location of the nut or the like is smaller than the exterior of the nut or the like. As a result, after setting, it will be possible for the body to be removed by pulling on it, with the nut or the like remaining behind. All kinds of structures can subsequently be coupled to a nut of this type. Apart from the coupling of two concrete parts to one another, it is also possible for other structures to be temporarily or permanently coupled. One example of a temporary coupling is a hoisting sling. This may comprise a bolt which can be secured to the nut and with a hoisting sling secured to the bolt. It is possible for this hoisting sling to be of universal design and for the bolt (and of course the nut) to be designed differently according to the load.

According to a further possible option of the present invention, it is possible, in a particularly simple way, to arrange a non-release shape in concrete material. One example is a screw thread-like shape. It has been found that if the body which is to be encased in the concrete is provided with an external screw thread which is likewise formed by the elastomer material, during the removal operation after setting the tensile force described above likewise occurs, with an associated reduction in size. As a result, a "bolt" of this type can easily come free of the set concrete material and a screw thread-like structure remains in the concrete material. As an alternative to a screw thread-like structure, it is also possible for other structures with projections, such as bayonet-like structures and the like, to be produced in this way, allowing easy removal of the body by pulling. The above-described properties of the body give rise to a reduction in cross section which is such that removal in this way is possible. It is preferable for the encased body to be provided with an external surface roughening, which imparts a corresponding roughening to the concrete after it has set, so that improved adhesion of the bonding or sealing material is possible. It is also possible for the cavity of the access passage to be provided with a screw thread, so that in a simple manner closure stoppers can be provided, which may be externally provided with a corresponding screw thread of, for example, concrete material which can ensure a (permanent) closure.

The above-described structure with a screw thread can be used, inter alia, for the attachment of props, temporary or permanent structural parts, for hoisting, for adjustment to the correct height and bearing of concrete elements (adjustment bolts) and for the temporary or permanent securing of safety features or scaffolding components.

According to a further example of the present invention, it is possible to produce all kinds of cavities in concrete material, which, optionally interacting with cavities in another or further concrete part, are subsequently filled with further (temporary) structures which can be secured to the concrete material for example by adhesive bonding.

According to a further advantageous embodiment of the invention, the body is provided with a core which has a high strength compared to the outer material. This core, for example a stud, is used to hold the opposite formwork walls together during the pouring of the concrete. After the concrete has been poured, the body, including the core, is simply removed in the manner described above and the opening formed can be sealed in the customary way. As a result, it is no longer necessary to use sleeves and the like which remain behind in the concrete and increase the cost price and may also have an adverse effect on the functioning of the concrete part. Of course, it is also possible to use the reverse structure, in which the body is provided with a core which functions as a spacer and the body including the spacer are removed after the concrete has been poured.

As an alternative to fixing the body with respect to the formwork, it is also possible to fix the body in any other conceivable way.

According to a further advantageous embodiment of the invention, it is possible to provide the body with a "floater"-like structure. This applies in particular when positioning the body with respect to a horizontal surface. While the concrete is being poured, this floater-like structure remains floating on top and as a result it is possible to accurately determine the position of the body with respect to the concrete.

It will be understood that it is possible to arrange a number of identical or different cavities next to one another in a concrete part in a single step. In such a case, the formwork has to be provided with a series of (optionally different) bodies which are then encased. These can either be removed simultaneously or removed successively. In a particular embodiment, a common carrier plate will be used.

BRIEF DESCRIPTION OF THE DRAWINGS

The invention will be explained in more detail below on the basis of exemplary embodiments illustrated in the drawing, in which:

FIGS. 1*a*, 1*b* show the arranging of a nut/shaft in a concrete structure;

FIG. 2 shows a further embodiment of the body which is to be encased;

FIG. 3 shows the structure of a non-release cavity;

DETAILED DESCRIPTION OF THE INVENTION

Figure 4:
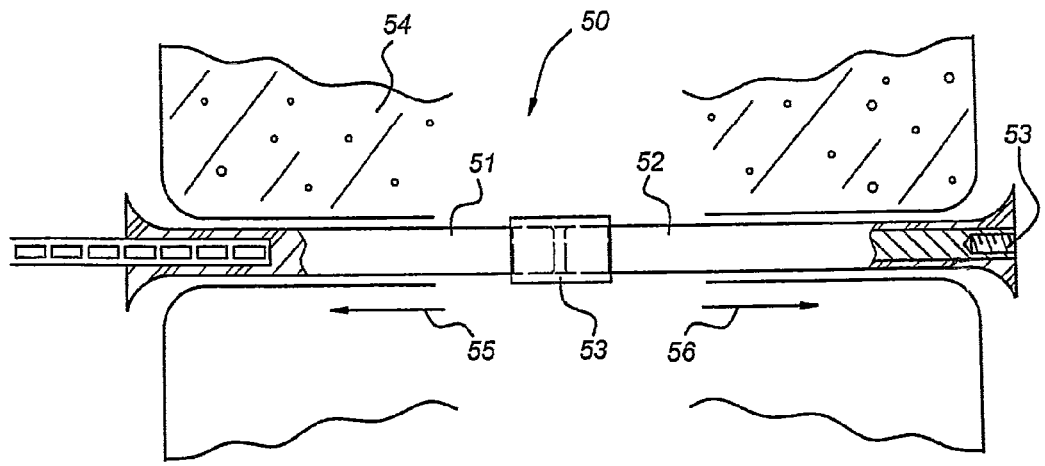
FIG. 4 shows a two-part body according to the invention.

FIG. 1 shows a use of the present invention. 23 denotes a body which consists of polysiloxane material and is provided with a reinforcing pin or spring 24. This body is provided with a local recess 25 for a (steel) nut 26 to be fixed in. Attaching the nut 26 is made easier by a fitting lip 27. The structure shown in FIG. 1*a* is placed into a formwork, after which concrete material is poured in. After the (partial) setting of this concrete material, body 23 is removed and nut 26 remains behind in the concrete material, which is denoted by 28 in FIG. 1*b*. As a result, a cavity 29 is formed, through which a screw thread part or the like can be fitted.

In FIG. 2, the body which is to be encased is denoted by 30 and embodied as a bolt. This means that it is provided with an external screw thread 31 and a head 32. An internal core or threaded sleeve 33 or other structure is present in order to enable the body 30 to be fitted to the formwork. After this body 30 has been encased in concrete material, the entire structure can be removed therefrom by pulling, with the result that a cavity which corresponds to head 32 and the adjoining shank remains in the concrete material, provided with an internal screw thread which corresponds to external screw thread 31. All kinds of structures can be temporarily or permanently screwed and/or bonded and/or poured into this cavity. One example is a concrete bolt by means of which two concrete parts can be adjusted with respect to one another. As an alternative to a screw thread, it is also possible to select other shapes, such as a profiling which creates a cavity in the concrete material with a surface roughness which is particularly suitable for adhesive bonding. By, moreover, designing the core of the body to give space, it is also possible for a body of this type to be removed from a cavity by simply pulling it, with the possibility of the screw thread or other irregular external peripheral shape moving inwards in the process.

FIG. 3 shows a concrete part 40 provided with a cavity 41 with a shaft 42 and a larger chamber 43. A cavity 41 of this type can be produced with a correspondingly dimensioned body made from elastomer material. This cavity 41 may be circular but may also be elongate. It is possible to fit bayonet-like structures into it. If this cavity is elongate and extends all the way to the at least one free end of the concrete structure, it is possible for bolts with heads to be pushed into it. If there is no free end present, hammer head bolts or the like which lock by rotation can be used. Structures of this type can be used to produce all kinds of anchoring formations on the concrete structure.

FIG. 4 shows a body which is to be encased and is denoted overall by 50. It comprises the parts 51 and 52 which are coupled with the aid of a coupling connection 53. It is clear that the bodies 51 and 52 are designed to end in the vicinity of the formwork surface. The concrete body in which a part 50 is arranged is diagrammatically indicated by 54. It is clear that given a relatively limited elastic deformability of the body 50, even with formations with a considerable non-release characteristic, easy removal is possible after encasing, in the direction indicated by arrows 55 and 56.

Means for adjusting/hoisting/securing and propping up an element which is to be positioned can be arranged in a cavity of this type or in a bayonet-like recess as described above.

Figure 5:
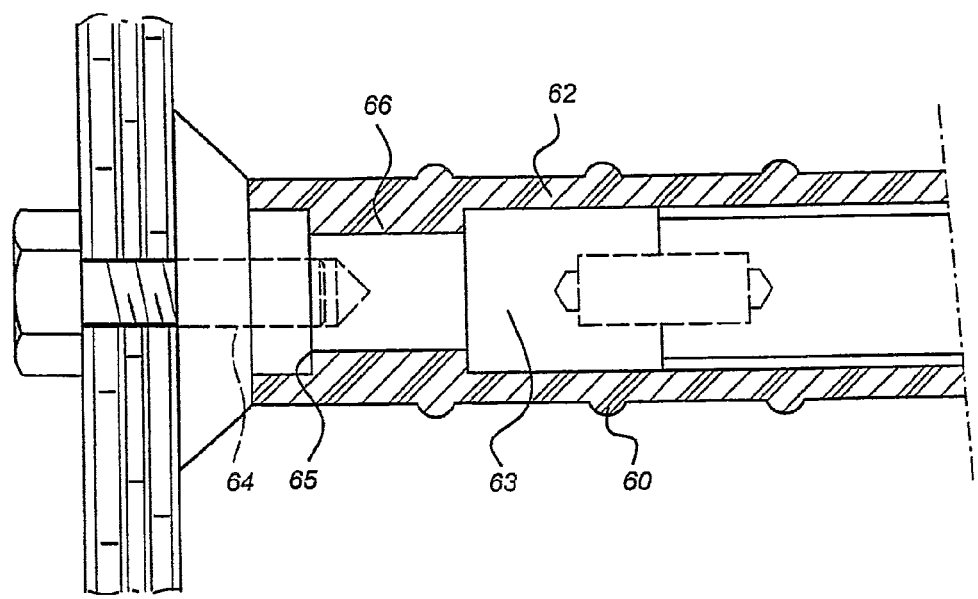
FIG. 5 shows a cross section through part of a preferred embodiment of the body according to the invention.

FIG. 5 shows a part of a body 60. It comprises an outer casing made from elastomer material, denoted by 62, and a core 63. This core is preferably of metallic design and provided, in the vicinity of the end at which it is secured to a formwork, with a screw-thread receiving part 64. It can be seen from the drawing that a recess 65 is present in the core 63, matching an annular projection 66 in the elastomer material. As a result, during removal any tensile force is transmitted to the elastomer material 62 via this structure.

Figure 6:
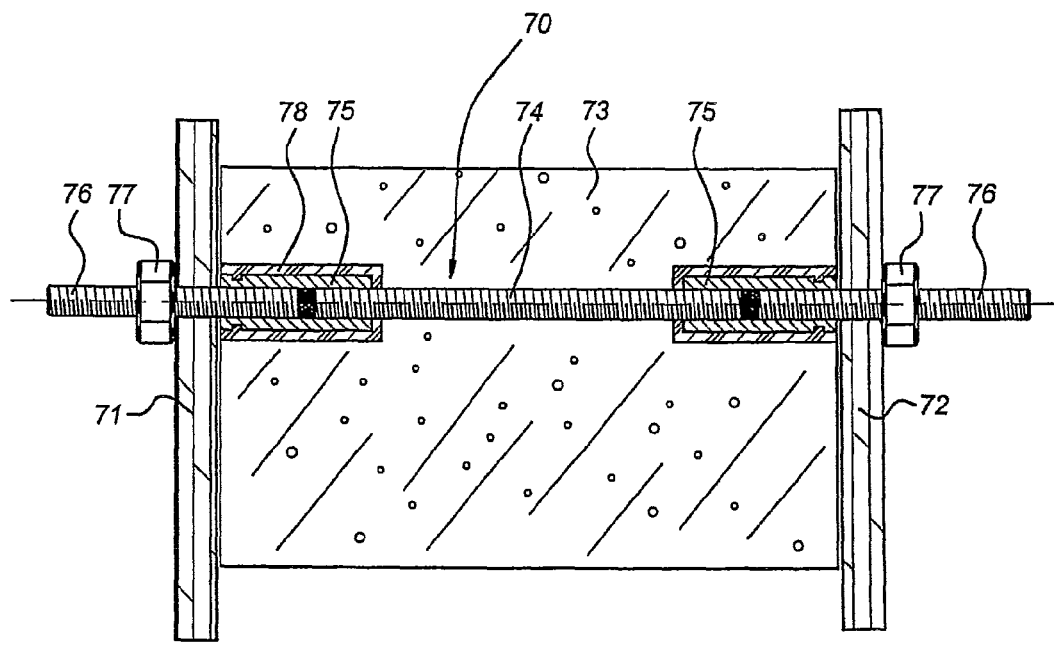
FIG. 6 shows a clamping system in accordance with the invention.

FIG. 6 shows two formwork walls 71 and 72, between which a concrete wall or the like, denoted by 73, is to be poured. The walls 71 and 72 will be pressed apart by the weight of the concrete which is to be poured. To prevent this, the invention proposes an assembled body 70 comprising a central stud 74, two coupling sleeves 75, adjoining studs 76 and nuts 77 screwed thereon. By tightening the nuts 77, the walls 71, 72 can be moved together and the coupling sleeves will also function as spacers. The coupling sleeves 75 are provided with an elastomer coating 78 in accordance with the present invention. After this structure has been encased, it is easily possible to remove both the studs 76 and the coupling sleeves 75. The cavity which remains can be filled by casting (watertight structure) or filled with a concrete stopper. If a concrete stopper of this type is bonded securely in place, it is also possible to provide a watertight structure. The sleeves 75 may be provided with an internal screw thread. Subsequently, a corresponding screw thread, for example for subsequently propping up/securing/connecting or hoisting, can be coupled to this internal screw thread. It is also possible for bracket or support structures to be connected onto or into this screw thread. It will be understood that numerous variants are possible to this structure. It will be immediately obvious to the person skilled in the art from the variants described above that the invention can be carried out in numerous ways. The person skilled in the art will arrive at further variants on reading the above description, and such variants lie within the scope of the appended claims.

The invention claimed is:

1. A method for arranging engagement means in a concrete part, comprising the steps of: providing a body whose exterior comprises an elastomer material, with mechanical properties which are such that there is a considerable reduction in the external diameter at removal from the concrete; providing a formwork, arranging said body at the formwork surface extending from one side of said formwork surface into said formwork, encasing said body in concrete material and removing it from the concrete after setting and removal of the formwork, said body being elongate and is removed from the concrete in its longitudinal direction and is provided with a projection which, at a distance from its end located at the boundary surface of the concrete, is positioned transversely with respect to the longitudinal direction, and after the concrete sets, the body leaves behind a non-release recess corresponding to the shape of the body's projection, with the surface of the set concrete surrounding the non-release recess shaped for an engagement part which is then fitted into the concrete, wherein said body comprises a core, wherein said core is relatively rigid, comprises a supporting surface having a diameter and is self-supporting, is secured against said formwork at the supporting surface by mounting means and is removed by pulling out the core together with said elastomer material from said concrete, wherein said supporting surface is at a first extremity of said body and said projection is provided at a second opposite extremity of said body, and wherein said mounting means extend through an opening in said formwork to the outside of said formwork, the diameter of said opening being smaller than the diameter of said supporting surface of said core secured against said formwork.

2. The method as claimed in claim 1, wherein said projection comprises a continuous surface designed in such a manner that it is able to absorb both tensile and compressive forces.

3. The method as claimed in claim 1, wherein said non-release recess comprises a screw threaded recess in the concrete material and the engagement part is designed accordingly.

4. The method as claimed in claim 1, wherein said non-release recess comprises a bayonet recess in the concrete material and the engagement part is embodied accordingly.

5. The method as claimed in claim 1, wherein the said engagement part comprises hoisting means.

6. The method as claimed in claim 5, comprises the step of providing a cavity which at both ends open out at the same boundary surface of the said concrete part, which cavity is U-shaped and is designed to receive a hoisting feature.

7. The method as claimed in claim 1, wherein the said engagement part comprises an adjustment bolt.

8. The method as claimed in claim 7, in which the said bolt comprises concrete material.

9. The method as claimed in claim 1, wherein the said core, because of its shape and configuration, gives space to the wall thereof.

10. The method as claimed in claim 1, wherein the said core is separated from the said elastomer material when the body is removed from the concrete.

11. The method as claimed in claim 1, comprising the step of providing a series of bodies which are secured to a common carrier.

12. The method as claimed in claim 1, wherein a series of engagement surfaces is arranged in a concrete part, which extend from an outer wall thereof, comprising the steps of, placing a series of bodies into said formwork, wherein each cavity comprising a blind bore.

13. The method as claimed in claim 1, wherein said concrete part is moved to the building site after said recess has been put in place.

14. The method as claimed in claim 1, wherein said body can be removed by hand.

* * * * *

UNITED STATES PATENT AND TRADEMARK OFFICE
CERTIFICATE OF CORRECTION

PATENT NO. : 8,663,527 B2  Page 1 of 1
APPLICATION NO. : 10/519272
DATED : March 4, 2014
INVENTOR(S) : Robertus Cornelis Maria van Rijn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1921 days.

Signed and Sealed this
Twenty-ninth Day of September, 2015

Michelle K. Lee
*Director of the United States Patent and Trademark Office*